Sept. 26, 1950     W. J. HAMPSHIRE     2,523,427
AIRPLANE WITH ADJUSTABLE WINGS
Filed Feb. 19, 1946     4 Sheets-Sheet 1
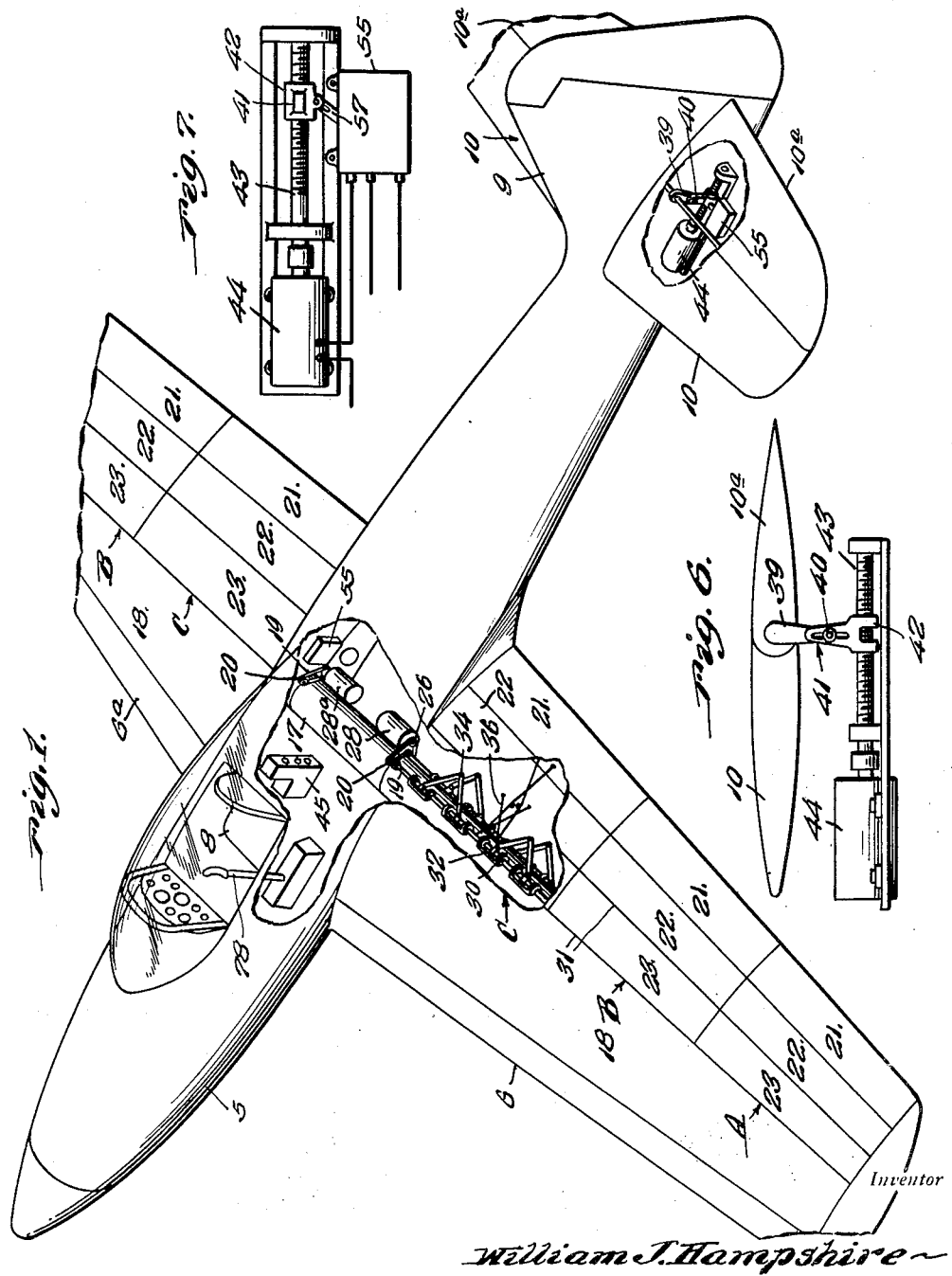
Inventor
William J. Hampshire
By Clarence A. O'Brien
and Harvey B. Jacobson
Attorneys Sept. 26, 1950 W. J. HAMPSHIRE 2,523,427
AIRPLANE WITH ADJUSTABLE WINGS
Filed Feb. 19, 1946 4 Sheets-Sheet 2
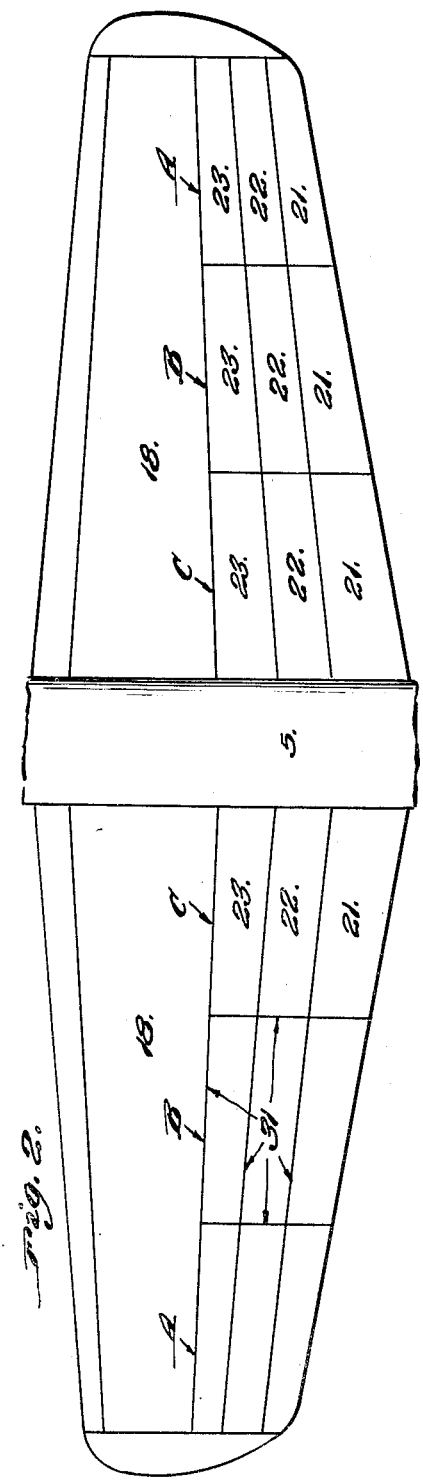
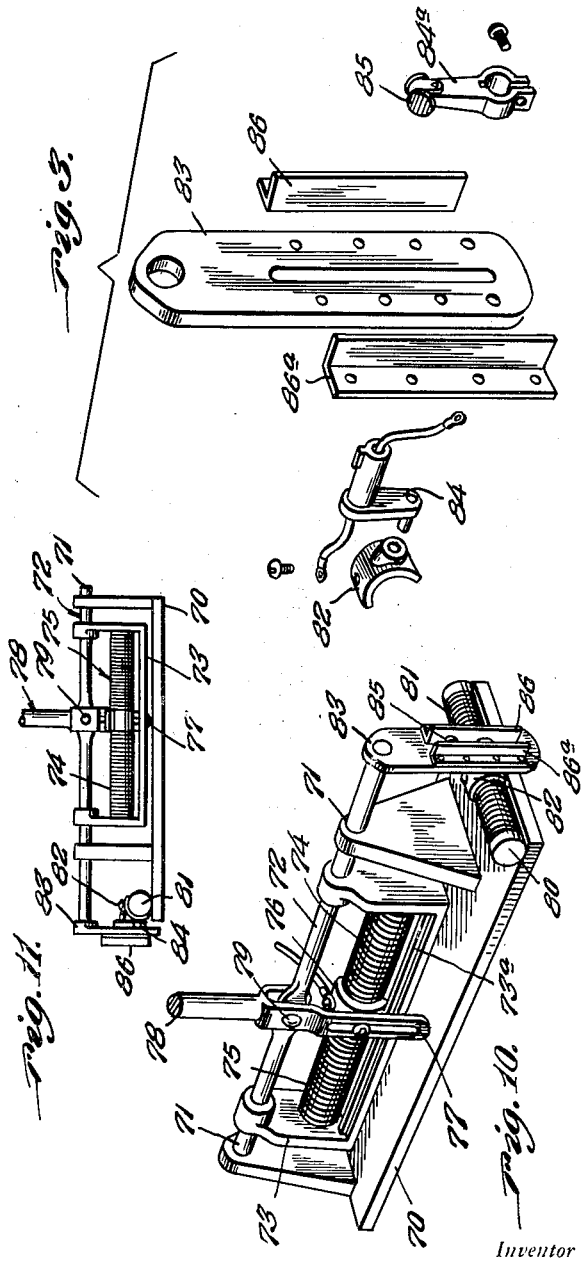
Inventor
William J. Hampshire
By Clarence A. O'Brien
and Harvey B. Jacobson
Attorneys

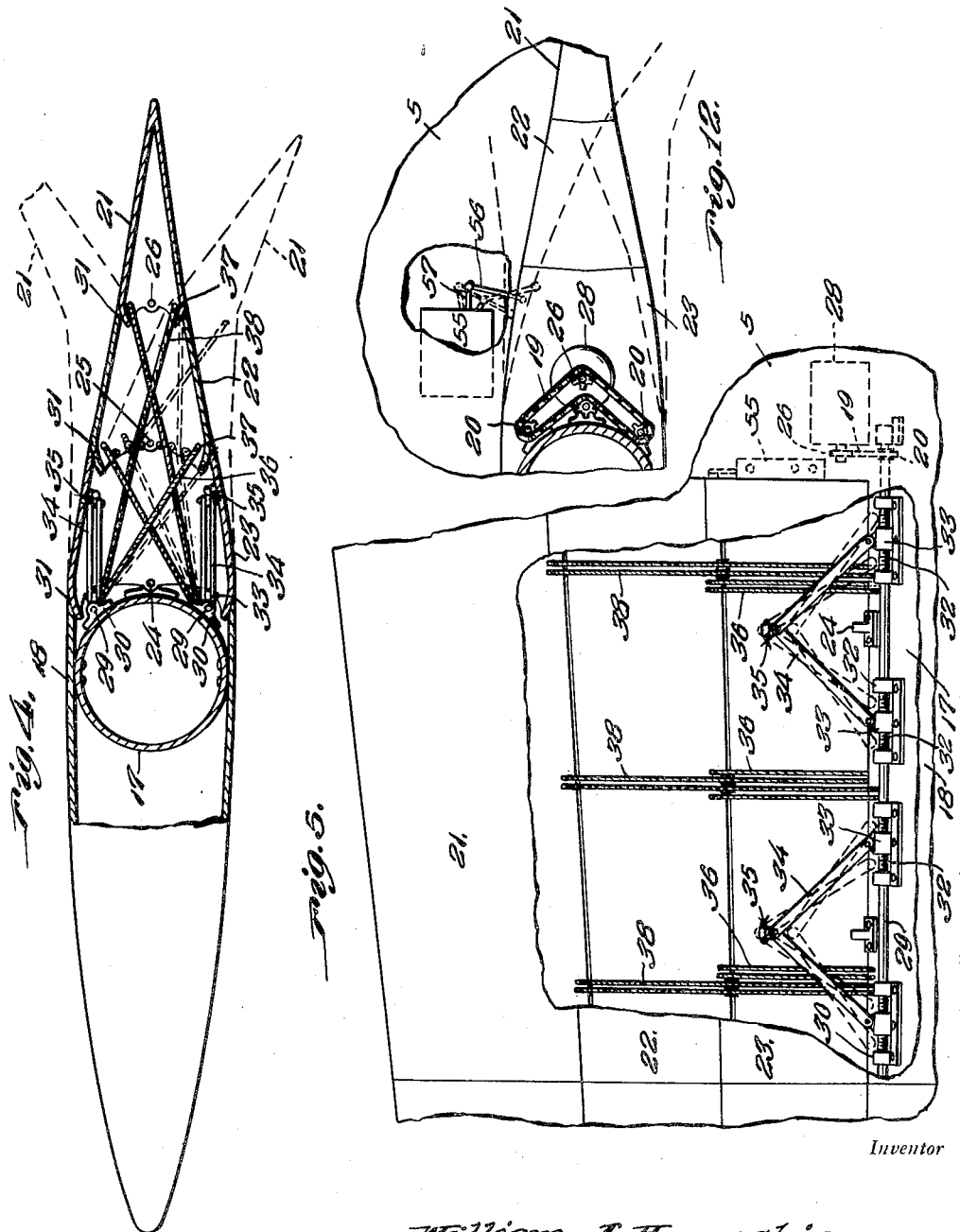

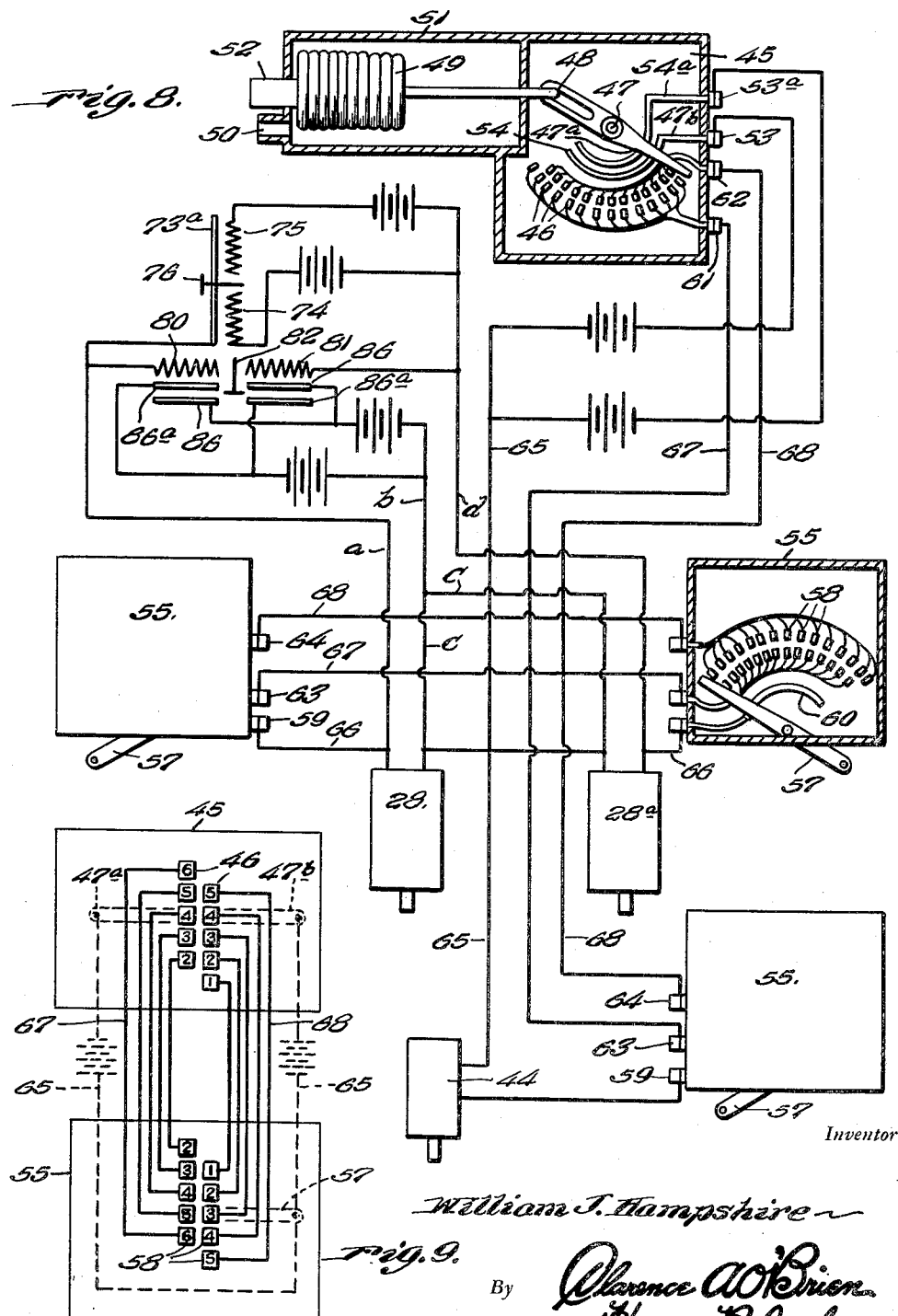

Patented Sept. 26, 1950

2,523,427

UNITED STATES PATENT OFFICE 2,523,427

AIRPLANE WITH ADJUSTABLE WINGS

William J. Hampshire, Cygnet, Ohio

Application February 19, 1946, Serial No. 648,596

6 Claims. (Cl. 244—44)

The present application is a continuation, in part, of my U. S. application for Airplane, Serial No. 524,045, filed February 26, 1944, now Patent No. 2,448,712, issued Sept. 7, 1948.

This invention relates to improvements in airplanes, and the primary object of the invention is to provide an airplane with wings which are adjustable to selectively provide the characteristics of a family or plurality of airfoils, and to provide mechanical means inside the wings to adjust the latter and thereby shift from one airfoil characteristic to another by changing the cross sectional contour of the wings.

Another object of the invention is to provide mechanisms in the wings and the tail plane of an airplane that are operated together by electrical means so as to effect automatic trim for directional flight.

Another object of the invention is to provide improvements in the form of an airplane wing, whereby the same is most effectively suited to use of the automatic trim mechanism to combine speed and performance or maneuverability.

Another object of the invention is to provide improved means for obtaining rolling action of the airplane without the use of ailerons and by means of a "stick"-operated reversible switch controlling motor-operated mechanism for shifting relatively movable hingedly connected wing sections.

Other objects of the invention are to provide improved mounting and operating means for jack mechanisms controlling the movable wing sections, and for correlating parts of the electrical mechanism with the wing sections.

The present invention was inspired by the need of better performance in high speed aircraft. At the present time, either speed or performance (maneuverability) must be sacrificed, one for the other. Each design has had its limits of use because of special features incorporated, the limits being greatly dependent upon wing design. The wing loading at present nearly determines performance, the ship having small wing loading being reasonably slower but performing well, and the ship having a large wing loading being characterized by fair performance and speed. These statements are general, however, as there are many other things that enter into actual performance calculations. The point is that designers have never been able to combine the best features of speed and maneuverability in the same airplane, although they have approached it to a reasonable extent in several types of modern combat ships. However, there has always been a tendency to sacrifice maneuverability for speed, and the purpose of this invention is to make possible the combination of speed, maneuverability, long range, and more horsepower per unit weight in the same airplane by controlling automatically the lift needed for each change in velocity during operation.

The present invention includes a new type of automatically controlled high lifting wing which is coordinated to operate in conjunction with the elevators of the horizontal tail planes to control the center of pressure travel. Mechanisms in both wings and the elevators of the tail planes are operated together by electrical means for effecting automatic trim for directional flight. When the wings change to the high lift airfoil form for slow speeds, the center of pressure moves far forward of normal, thus causing a needed "up" load on the tail plane surface, so the trailing edges of the elevators are lowered by the system.

The exact nature of the present invention will become more clearly apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a somewhat diagrammatic perspective view of an airplane embodying the present invention, one of the wings being broken away, and the fuselage, one of the wings and one of the tail planes being broken away to reveal parts of the invention located therein.

Figure 2 is a top plan view of the wings and the adjacent portion of the fuselage forming part of the airplane shown in Figure 1.

Figure 3 is a developed perspective view of the current transfer switch carried by an arm of the "stick" or lever-operated reversible switch.

Figure 4 is a sectional view, partly diagrammatic, showing a typical transverse section of one of the wings, together with associated parts.

Figure 5 is a fragmentary plan view of one of the wings, partly broken away to reveal the jack mechanism associated with the movable wing sections.

Figure 6 is a side elevational view showing the operating mechanism for the elevators or movable sections of the tail planes.

Figure 7 is a plan view of the construction shown in Figure 6 with the tail plane omitted.

Figure 8 is a view partly in section and partly diagrammatic, illustrating the electrical system forming part of the means for automatically effecting trim for directional flight, including the pilot's reversible switch.

Figure 9 is a wiring diagram showing the relationship of the contacts of coordinated switching devices forming part of the system illustrated in Figure 8, so as to reveal more clearly the theory of operation thereof.

Figure 10 is a perspective view of the pilot's "stick" or lever-operated reversible switch for controlling the driving motors which operate the actuating mechanisms for the movable wing sections, whereby to effect any desired differential in lift for the airplane.

Figure 11 is a side elevational view of the construction shown in Figure 10.

Figure 12 is a fragmentary enlarged detail view illustrating the manner of connecting certain control switches, of the electrical system shown in Figure 8, with movable wing sections of the airplane.

Referring in detail to the drawings, the airplane includes a suitable fuselage 5 having wings or wing panels 6 and 6a extending laterally therefrom, said wings 6 and 6a having a symmetrical streamlined cross section and permanently set at 0 degrees incidence with the fuselage 5. The trailing portions 21, 22, and 23 of said wings are adjustable to conform to the contour of a family of airfoils of progressively greater camber. The airplane has the usual tail planes or fins and rudder 9 and dynamic stabilizers 10 for maintaining the fuselage thrust line parallel to the relative wind as well as for effecting dynamic equilibrium for the airplane. The tail plane 9 may be similar to conventional design.

In flight of heavier than air aircraft, lift is proportional to the square of velocity, wing area, and the characteristics of the type of airfoil used in the design. The characteristics of a conventional airfoil vary with the angle of attack (the angle formed between a reference line through the airfoil called the chord line and the flow of air opposite to the path of motion of the airfoil called relative wind). Drag varies in the same manner as lift on a given airfoil or wing. The drag referred to here is total wing drag. Wing drag is commonly divided into two parts known as; (1) profile drag or the energy absorbed by the air due to skin friction of the surface and depending chiefly on the shape of the airfoil. It is independent of angle of attack up to the "burble" point or stalling angle of the airfoil, and of aspect ratio (the relationship between span and chord of a wing). (2) Induced drag which is the inefficiency factor of a wing or the drag caused by lift. It is caused by the flow of air from the lower surface over the wing tip to the upper surface which is known as a wing tip vortice. The magnitude of tip vortices varies inversely with the aspect ratio of a wing. For a constant velocity, induced drag depends upon the lift coefficient, which depends upon the angle of attack of the airfoil. A symmetrical airfoil has a lift coefficient of 0 and thus no induced drag when operating with an angle of attack of zero degrees. The characteristics or lift and drag coefficients of different airfoils vary due to the shape of the leading edges, the mean camber or mean curvature of upper and lower surfaces and the thickness. The most practical method of obtaining a greater range of characteristics for a given airfoil is by changing the camber by use of flaps. Flaps are successful at slow speeds for which they are designed.

An airplane's performance is dependent upon the characteristics of the airfoil it uses. Its performance would be greatly improved if it could use the more favorable characteristics of different airfoils at different speeds. The purpose of this invention is to make available to any airplane the desired or most favorable characteristics of a plurality of airfoils, thereby giving it a greater range of efficient operating velocities, a very high maximum velocity and a low minimum velocity.

To accomplish the desired results, I have developed a symmetrical streamlined body which is adjustable to provide a family of airfoils by progressively changing the percent of camber from 0% in the symmetrical airfoil to approximately 10% in the high lift airfoil, or vice versa. The camber is expressed in percent of wing chord by the standard N. A. C. A. airfoil design procedure. Each airfoil in the family is used through a 20 M. P. H. velocity range. That is, a dynamic pressure-controlled reversible switch 45 is used to change airfoils upon every plus or minus 10 M. P. H. velocity variation by controlling electrically operated mechanical means. The electrical system (shown in Figure 8), consists of a D. C. electrical source, a dynamic pressure controlled reversing switch 45, three position-establisher reversing switches 55, three solenoid brake equipped reversible D. C. motors 28, 28a and 44, and suitable electric wiring 65, 66, 67 and 68.

The change or shift from one airfoil to another is accomplished mechanically by building the trailing portion of each wing in three divisions A, B, and C composed of nine sections, as shown in Figure 2, the sections of each division being respectively indicated at 21, 22, and 23. From root to tip, the divisions are one-third of each wing span for the wing of a small airplane. The divisions laterally are determined by the amount of tip whip or vertical bending allowed by the wing structure design. The purposes of these lateral or spanwise divisions are threefold. The first consideration was made for flight stability at slow speeds. It is desired to have an airplane wing stall or lose lift from the spanwise center outward to reduce the tendency of the airplane to fall off on one wing and spin. To have this desired stalling characteristic a wing must be designed either to have a smaller angle of attack in the tips, use slots in the tips, or use a different airfoil in the tips that stalls at a larger angle of attack than the airfoil in the rest of the wing. The latter is used in this invention, the screw pitch of the jack mechanism in the outboard divisions being smaller and causing it to have less travel so as to select the desired airfoil from the family of less camber. The second reason for the lateral divisions was to distribute the spanwise load to the mechanism and allow smaller more compact units. The third reason, and the one determining the number of spanwise divisions, is to limit the binding of hinged joints and distortion of the mechanism caused by tip whip or vertical bending of the wing structure during maneuvers and in gusty air. The purpose of a plurality of sections longitudinally is to conform to the contours of the family of airfoils previously described. The use of divisions and sections in the wing also provides less expensive and easier replacement of damaged or worn out parts. It will be noted that the sections 21, 22 and 23 have sealed joints 31. It is important to the efficiency of the airfoils of the family to keep these joints sealed. It will be noted that all divisions and sections of this wing are suitably sealed by closely fitted parts sliding upon each other (see Figures 2 and 4). Felt or other suitable gasket material may be used to insure this, so that there is no leakage of air from the lower surface to the upper surface through the airfoil. If such leakage were allowed it would reduce the efficiency of the airfoils up to 30% of the maximum lift coefficient gained by them. Reference to this may be obtained from the second publication by Diehl an Engineering Aerodynamics or N. A. C. A. Technical Reports.

The sections of each division are hinged to each other longitudinally along the center leading edge of each as at 24, 25 and 26 (see Figure 4). Four folding screw-type jack mechanisms are located in each division of the wing. Two are in the upper leading edge of each section 23 and connected to it at 35, and two are located in the lower leading edge of each section 23 and connected to it at 35 directly below those first mentioned. The four jack mechanisms, chain driven by a reversible electric motor, are connected so that they cooperate, when the operating screws of the mechanism are rotated by the chain drive from the motor, to raise or lower the section 23 as desired according to the direction of rotation. Movement up or down of section 23 causes the desired movement of sections 22 and 21 since they are connected to spar 17 by steel cables 36 and 38 in a manner clearly shown in Figures 4 and 5. The lower leading edge of section 22 is connected by three cables 36 to the upper part of spar 17. Another three cables 36 of the same length connects the upper leading edge of section 22 to the lower part of spar 17. Section 21 is connected to spar 17 in the same manner by six cables 38. Cables 38 are carried through section 22 by guide pulleys located just above and below the hinge 25 in the leading edge of section 22. The above cable linkage is arranged so that when section 23 is moved in either direction by the jack mechanisms the other sections 22 and 21 move in the same direction. The rotation angle of section 23 upon hinge axis 24 is of the same magnitude as the rotation angle of section 22 upon its hinge axis 25 and that of section 21 is 2.25 times the magnitude of the rotation angle of section 22. The deflection of the sections 22 and 21 is magnified due to the movement up or down of their respective hinge axes. For example if section 23 is deflected downward it moves the hinge axis 25 of section 22 in an arc downward. Cables 36 connected to spar 17 are of a fixed length and they establish tension upon the lower leading edge of section 22 and allow the same amount of slack upon the upper leading edge of section 22, causing it to rotate downward upon its axis 25. The rotation and displacement of section 22 lowers hinge axis 25 of section 21 through a greater arc than that of section 22, and cables 38, of a fixed length and connected to spar 17, cause rotation of section 21 upon its axis 26 to be greater than that of section 22. As shown in Figures 1, 4 and 5 the jack mechanisms include two rotary shafts 29 journaled in brackets 30 anchored to the spar 17 and running the full length of the wing panel, one at the upper and one at the lower trailing edge of the supporting section 18. These shafts each have four threaded portions 32 coincident with each division. Nut members 33 are provided on each threaded portion of screw 32 and are connected by links 34 with swivel joints 35 which are anchored to the forward section 23 of each division. The two shafts 29 of each wing panel are driven by sprocket gears 20 which are located on the inboard end of each shaft 29 within the fuselage 5 and which are connected by chain 19 with motor drive sprocket 26 (see Figures 5 and 12). Chain tension is adjustable by use of sliding motor mounts. The jack mechanism in the tip division of each wing panel have a smaller screw pitch than those in the other divisions to provide airfoils in the outboard division with less camber than those of said other divisions and thereby insure safe operation of slow speeds.

The elevators 10a have a depending control horn 39 connected by a pin and slot connection, as at 40, with an upstanding arm 41 of a nut member 42 carried by a rotatable operating screw 43 which is driven by a solenoid-brake-equipped reversible motor 44 housed in the rear end of fuselage 5 (see Figures 1, 6 and 7). By this means, the elevators are raised and lowered, depending upon the direction of rotation of screw 43 by means of motor 44.

The adjustment or movement of the movable wing sections and of the elevators of the tail plane is controlled by a reversible brush-type switch generally indicated at 45 in Figures 1, 8 and 9. This switch includes two arcuate series of contacts 46 and two arcuate conductors 54 and 54a over which is movable one end of a switch lever 47, which carries two movable contact conductors 47a and 47b suitably insulated from it and each other. The other end of lever 47 is operatively connected at 48 to a bellows 49 communicating with a Pitot static tube (not shown). This construction is conventional to the extent that tube 50 for static pressure connects the static pressure chamber of the Pitot tube (not shown) with casing 51, and tube 52 for dynamic pressure connects the dynamic pressure chamber of the Pitot tube (not shown) with the bellows 49. The movable switch lever 47 maintains constant electrical contact with terminals 53 and 53a because those terminals are connected with conductors 54 and 54a on which the two movable contact conductors 47a and 47b carried by lever 47 ride at all times. The contact conductors 47a and 47b simultaneously connect corresponding contacts of the arcuate series 46 with conductors 54 and 54a. Contact conductor 47a connects conductor 54a with contacts of the outside row of arcuate series 46 by a wire running along the top side of lever 47, while contact conductor 47b, being one unit, connects conductor 54 with contacts of the inside row of arcuate series 46. A second brush-type switch 55, known to the system as a position establisher, is linked (as shown at 56 in Figure 12) to the section 23 of the inboard division of each wing, the link connecting said section with a movable contact lever 57 of switch 55. Movable contact lever 57 is movable over and cooperates with an arcuate series of contacts at 58, and is electrically connected with a terminal 59 at all times by bearing upon conductor 60. It will be noted that each series of contacts 46 and 58 includes two concentric rows of contacts, and that the contacts of each row are electrically connected to the same contact in each corresponding row of contacts (see Figure 9) through cannon plugs 64 and 63 respectively (see Figure 8). The terminals 53 and 53a are connected by wires to electrical sources of opposite polarity, the selected current is carried by wire 65 to one side of each of the solenoid brake equipped motors 28 and 28a for the respective wings and to the solenoid equipped motor 44 associated with the elevators 10a of the tail plane. The other side of each motor is connected by a wire 66 with the terminal 59 of its associated switch 55. The cannon plug 63 of each switch 55 is connected by the bundle of wires 67 with the cannon plug 61 of switch 45, while the cannon plug 64 of each switch 55 is connected by the bundle of wires 68 with the cannon plug 62 of the switch 45. It will be apparent that a solenoid brake equipped motor 28 or 28a is provided for the mechanism of each wing, and that another solenoid brake equipped motor 44 and switch 55 are associated with the movable elevators of the tail plane. As shown in Figure 7, the switch 55 associated with the elevators has its movable contact lever 57 connected by a pin and slot connection 69 with the nut member 42 so that said lever 57 is operated simultaneously with movement of the elevators. The arrangement is such that the switches 55 shut off the current when the proper position has been reached by the movable wing sections and the solenoid brake equipped motors 28, 28a and 44 are stopped instantaneously. The arcuate series of contacts 46 and 58 of switches 45 and 55 respectively are arranged to move the wing sections and thereby change or shift airfoils upon plus or minus ten miles per hour variations in velocity. The switch and motor for the tail plane control, the moment coefficient or center of pressure travel of each airfoil of the family, and the system thereby effect automatic trim for each airfoil of the family at its proper operating velocity, which is every twenty miles per hour interval throughout the velocity range.

The reversible switch principle is shown in Figure 9 wherein contact lever 47 is extended to show the function of movable conductors 47a and 47b. By use of dotted lines wire 65 is shown as two conductors for simplicity and individual wires of bundles 67 and 68 are shown connected to their respective contacts, which are numbered. The quantity of contacts is reduced to five per row and are represented in straight parallel lines instead of concentric arcs. It will be noted that contacts are numbered one through six in both switches. In switch 45 they are arranged so that like contacts No. 2 through No. 5 of both rows are opposite each other and the rows are staggered so that No. 1 and No. 6 appear at opposite ends of different rows. In switch 55 the contacts are arranged so that odd No.'s 3 and 1, and even No.'s 4 and 2 etc. appear opposite each other, while No. 2 and No. 5 are at opposite ends of different rows. It will be noted that movable conductors 47a and 47b in switch 45 are connected with electrical sources of opposite polarity, from which a common wire 65 is connected to movable switch lever 57 in switch 55. With the system in a neutral condition the movable conductors 47a and 47b appear across opposite contacts No. 4 of switch 45 while movable switch lever 57 appears across contacts No. 3 and No. 5 in switch 55. In this condition both circuits are open and motors 28, 28a and 44 are inoperative with brakes engaged by spring tension. As an example of the operation of the system, it will be assumed that the air speed is increased ten miles per hour, in which case movable conductors 47a and 47b are moved by the linkage to the bellows 49 upward across contacts No. 5 in switch 45, the circuit then being completed through movable conductor 47a, its electrical source, wire 65, movable switch lever 57 and contact No. 5 of switch 55 so that the brakes on motors 28, 28a and 44 are disengaged by solenoid action against the spring tension in each and the motors 28, 28a and 44 move the wing sections and elevators, which in turn shift the movable switch levers 57 of switches 55 downward across contacts No. 6 and No. 4, whereupon the circuit is opened and motors 28, 28a and 44 are stopped instantaneously because their respective solenoids release and spring tension engages their brakes. When the air speed decreases ten miles per hour, the reversal of this operation take place through the other circuit, and it will thus be seen that a different airfoil from the family is selected at ten miles per hour intervals of the air speed for either acceleration or deceleration.

Since ailerons are not used, rolling action is obtained by a "stick"-operated reversible switch connected directly to each wing motor as shown in Figures 8, 10 and 11, which effects any desired differential in lift. This switch includes a base 70 having spaced bearings 71 in which are journaled the ends of a longitudinally arranged shaft 72. Movable with and suspended from the shaft 72 is a cradle 73 carrying rheostats 74 and 75 which are suitably insulated from each other, and along which is slidable a contact or brush carrier 76 operable by a depending arm 77 of a hand lever or "stick" 78. The lever 78 is pivoted to the shaft 72 upon a transverse axis 79, and it is noted that the pivots at the bearings 71 and at 79 are snug friction-type pivots. Another pair of rheostats 80 and 81, which are insulated from each other, is carried by the base plate 70 and a contact or brush 82 is movable along these rheostats and operable by an arm 83 carried by and depending from the rear end of the shaft 72. Arm 83 carries two bar type contacts 86 and 86a one on either side of the slot in arm 83 and a transfer switch 84 which has contact points 85 attached rigidly to it by point lever 84a (see Figure 3). Transfer switch 84 is pivotally mounted at its center and lower end, the center pivot riding in the slot of arm 83 and the lower end pivot riding in the socket of brush 82 thus linking arm 83 to brush 82. The three positions of transfer switch 84 are: Left (on), Centered (off) and Right (on). When arm 83 is moved to the left, transfer switch 84 is pivoted to the Left (on) position and allows current to flow through bar contact 86a. When arm 83 is stopped and moved slightly to the right, transfer switch 84 is pivoted to the Centered (off) position and current flow is stopped. Upon movement of arm 83 farther to the right transfer switch 84 is pivoted to the Right (on) position allowing current to flow through bar contact 86. Bar contacts 86 and 86a are connected to electrical sources of opposite polarity, said electrical sources being connected by the wire "b" which branches into two wires "c" in order to connect one side of each motor 28 and 28a. The other side of each motor 28 and 28a respectively is connected by a wire "a" and "d" respectively with rheostat 80 and 81 respectively (see Figure 8). The rheostats 74 and 75 are connected to electrical sources of different polarity, and said electrical sources are connected by a common wire "d" to one side of the right wing motor 28a. The motors 28a and 28 are connected in series and the remaining side of the left wing motor 28 is connected by a common wire "a" with the conductor 73a upon which the contact or brush 76 rides at all times. It will be noted that each rheostat 80 or 81 operates one wing motor 28 or 28a individually for either direction of rotation by use of a current transfer switch 84 for control of the airplane about its longitudinal axis or to obtain rolling action, while both rheostats 74 and 75 operate motors 28 and 28a simultaneously, each for one direction of rotation only, for control of the airplane about its lateral axis or to obtain pitching action. The arrangement is such that the "stick" or lever 78 moves the contacts or brushes 76 and 82 so as to adjust the rheostat resistance. It will be noted that the control functions of conventional ailerons and elevators are performed by the direct control of the family of airfoils of the wing (provided in this invention for the pilot's use at his discretion), by means of the "stick" operated reversible switches shown in Figures 1, 10 and 11. For example if the "stick" 78 is moved by the pilot to the right to establish a desired bank to the right, the "stick" 78 moves arm 83 to the left by linkage of both to shaft 72 (see Figure 10). Arm 83 causes the transfer switch 84 to pivot thus shifting contact points 85 to the Left (on) position, closing a circuit through bar contact 86a and sliding brush or contact 82 to the left along rheostat 80 for adjusting its resistance. The bar contact 86a allows current to flow through rheostat 80 to the left wing motor 28, whose brake is released by solenoid action against spring tension and the motor 28 rotates in the direction to increase camber of the left wing thus causing it to rise and establish a bank to the right. When the desired degree of bank is reached the pilot moves the "stick" 78 back to the centered or vertical position. When the "stick" 78 changes direction of movement the current transfer switch 84 pivots through the Centered (off) position to the Right (on) position, momentarily interrupting and changing the direction of the current flow through rheostat 80 as the circuit is closed through bar contact 86. Upon interruption of the current flow, the brake on motor 28 operates, stopping its rotation to allow the reversed current flow through bar contact 86 to rotate the motor 28 in the opposite direction instantaneously, thus returning the deflected wing section to its original position and the airplane maintains the desired banked condition. The banked condition is destroyed by reversing the operation that was used to establish it. Turns in either direction are made in this manner. It will be noted that only one wing and its respective mechanism is used to start or stop a turn. Lift on the outside wing of a turn is increased while the lift on the inside wing is undisturbed except by the slight decrease in velocity that it receives from its inside location in the turn. This reduces the tendency for the airplane to lose altitude in a turn, so that very little "back pressure" from the pilot is required upon the "stick" in a level turn. If the "stick" 78 is moved forward by the pilot to establish a dive, rheostat 74 allows current to flow from an electrical source through both motors 28 and 28a in series causing them to rotate in the same direction in a manner to decrease the camber of both wings simultaneously. Lift of the entire main wing is reduced while lift on the dynamic stabilizer 10 and 10a is undisturbed, causing the airplane to "nose down" for establishing a dive. The stick is returned to a vertical position as soon as the desired angle of dive is reached and the motors are stopped simultaneously. The automatic control system positions the dynamic stabilizer 10 and 10a for the increase in velocity and the airplane is trimmed to hold the diving attitude. Termination of the dive is accomplished by backward movement of the "stick" 78 which allows current to flow through rheostat 75 to motors 28 and 28a in series in the proper direction to produce rotation of motors 28 and 28a that will increase the camber of both wings simultaneously thus increasing the lift of both wings causing the airplane to "nose up" out of the dive. The airplane is trimmed for the change of velocity by action of the automatic system upon the dynamic stabilizer 10 and 10a. Any desired climb may be established and terminated by reversing the procedures used for a dive.

It will be noted that wing mechanisms allow an equal amount of positive and negative camber. The reasons for this are three fold: First, to permit outside maneuvers and inverted flight. Second, to obtain normal control of the airplane at very high velocities when the symmetrical airfoil of the family is being used by the wing. Third, to provide interchangeability of the wing panels for simplicity and less expense in both the manufacture and the maintenance of an airplane. The range of negative camber is operated only by the pilot's control system or the "stick" operated reversible switches, since airfoils of negative camber from the family are used only for inverted flight, outside maneuvers, and control at very high speeds. The automatic system could be adapted to function for the airfoils of negative camber by incorporating slight modifications and this may be done if so desired. At this time, it does not seem necessary, since inverted flight and outside maneuvers are rarely used, and normal control of the airplane at very high speeds, as at any speed, is a result or function of physical effort of a human being. It will be noted that from a pilot's viewpoint "stick" action is conventional. Control response from the "stick" operated reversible switches is instantaneous with movement. Movement of the "stick" in any direction results in a conventional response to control by the airplane. For example, all maneuvers must be coordinated by the use of "stick and rudder," a level turn to the right requires "right stick" and "right rudder" with the required amount of "back pressure" or "back stick" to "hold altitude." All of the current maneuvers, chandelles, rolls of all types, lazy eights, etc. are performed by the conventional use of the "stick and rudder."

In summary, the functions of the automatic flight control system are: First, to select and mechanically position, from a family of airfoils, the airfoil that is the most efficient for each 20 M. P. H. interval of velocity from the airplane's minimum flight velocity up to and including its maximum velocity. Second, to maintain the fuselage in a position parallel to the relative wind so that it will give the least possible drag in all level flight. Third, to aerodynamically balance or trim the airplane at the prescribed velocity for each airfoil used, from the family, in level and directional flight. Fourth, to reduce pilot fatigue on long range flights.

The functions of the pilot's system are: First, to maneuver the airplane in conditions other than level flight. Second, to decrease the labor involved in maneuvering an airplane at high speeds. Third, to increase the maneuverability of an airplane in flight at all speeds.

The pilot's control system works in conjunction with the automatic flight control system. Since both systems operate simultaneously it is necessary for three electric motors to be used one for each wing and one for the aerodynamic stabilizer. For example, in a climbing turn from level flight at a constant power setting, when the airplane starts to climb its velocity is decreased, causing the automatic system to start its operation to change airfoils and trim. The wing motors are rotating at the same speed when the pilot moves his "stick" to establish a bank, and this allows more current to flow to one of the motors causing it to rotate faster than the other. Both wings are changing camber, but one is changing faster than the other, thus creating a greater amount of lift on one wing and establishing the desired bank.

It is also noted that it is necessary to use at least two sources of electricity and a two wire electrical wiring system (see Figure 8). Also, the various parts of the jack mechanisms are located within the structure of the wings, the switches 55 for the wings are mounted in the fuselage adjacent to the motors and near the inboard ends of the wings, and the wings are interchangeable, left for right or right for left.

The construction and operation of the various devices or mechanisms having been individually described as the description progressed, it is believed that the same will be readily understood by those skilled in the art. No attempt has been made herein to go into refinements of construction in great detail because they relate largely to engineering and well known general principles of aircraft construction. Accordingly, the drawings are merely generally illustrative of the principles and ideas involved. For instance in Figure 5 it can be readily seen that the threaded portions 32 of shaft 29 are of oppositely threaded form to bring about the desired action. One need only consider the comparison of full and dotted line position of parts in this figure to realize this fact. It will be apparent that the invention is not restricted to the exact details of constructions or type of mechanisms illustrated, but merely to their equivalents, in so far as bringing about the desired results are concerned.

What I claim is:

1. In an airplane, the combination of a fuselage having oppositely extending wings adjustable as to camber to take the forms of a plurality of airfoils having progressively different lift characteristics, and means to automatically adjust the wings to vary their life characteristics in accordance with a plurality of predetermined changes in the speed of travel of the airplane so that the lift characteristic is progressively raised as the speed is reduced in predetermined decrements and progressively lowered as the speed is increased in predetermined increments, said means including a mechanical device operable for adjusting each wing as to camber, a reversible electrical operating motor for each mechanical device, and a dynamic pressure operated selector switch and a position establisher switch operated by adjustment of each wing for controlling each motor.

2. In an airplane, the combination of a fuselage having oppositely extending wings, adjustable as to camber to take the forms of a plurality of airfoils having progressively different lift characteristics, means for adjusting said wings including reversible operating motors, and a stick-operated switch for controlling said motors to selectively adjust either desired wing or to simultaneously and similarly adjust both wings, said adjusting means being constructed to give the outboard portions of said wings less camber than the inboard portions thereof when the camber of said wings is increased or decreased.

3. In an airplane, the combination of a tail plane including an elevator adjustable to control the center of pressure location, and means to automatically adjust the elevator in accordance with predetermined changes in the speed of travel of the airplane so as to increase the upload thereon as the speed of travel of the airplane is reduced in predetermined decrements and to decrease the upload thereon as said speed is increased in predetermined increments, said means including a mechanical device operable for adjusting said elevator, a reversible electrical operating motor for said mechanical device, and a dynamic pressure operated selector switch and a position establisher switch operated by adjustment of said elevator for controlling said motor.

4. In an airplane, the combination of a fuselage having oppositely extending wings, each of said wings being provided with a plurality of trailing divisions, each composed of a plurality of adjustable sections movable to vary the lift of said wings, means associated with each wing to simultaneously move the sections of its divisions, a reversible motor for operating each of said last named means, dynamic pressure controlled reversing switch means responsive to a plurality of predetermined variations in the speed of the airplane to automatically place said motors in operation in the proper direction and for a duration proportional to increase or decrease of said speed, and further switch means operatively connected with an adjustable section of each wing to automatically render the associated motor inoperative when the movable wing sections of each wing have moved predetermined distances for varying the lift of said wing in accordance with said variations in the speed.

5. In an airplane, the combination of a fuselage having oppositely extending wings, each of said wings being provided with a plurality of trailing divisions, each composed of a plurality of adjustable sections movable vertically to vary the lift of said wings, means associated with each wing to simultaneously move the adjustable sections of its divisions with a differential movement between the out-board and in-board divisions, a reversible motor for operating each of said means, dynamic pressure controlled reversing switch means responsive to a plurality of predetermined variations in the speed of the airplane to automatically place said motors in operation in the proper direction and for a duration proportional to increase or decrease of said speed, and further switch means operatively connected with an adjustable section of each wing to automatically render the associated one of said first named motors inoperative when the movable wing sections of said wing have been moved predetermined distances for varying the lift of said wings in accordance with said variations in said speed.

6. In an airplane, a fuselage, wings extending laterally from the fuselage, each wing including a fixed portion provided with a spar and a trailing portion adjustable to conform to the contour of a family of airfoils of progressively different camber, each trailing portion being composed of a plurality of spanwise divisions, each division being divided longitudinally of the fuselage into three sections hinged to each other along the center leading edge of each, four folding screw-type jack mechanisms located in each division with two in the upper leading edge of each leading section and two in the lower leading edge thereof, there being a screw-carrying shaft common to the mechanisms in the upper leading edges of the leading sections and a second screw-carrying shaft common to those in the lower leading edges of the leading sections, and cables respectively connecting the upper part of the spar to the lower leading edges of the intermediate and trailing sections and the lower part of the spar to the upper leading edges of the intermediate and trailing sections.

WILLIAM J. HAMPSHIRE.

REFERENCES CITED

The following references are of record in the file of this patent:

UNITED STATES PATENTS

| Number | Name | Date |
|---|---|---|
| 1,413,553 | Stevens | Apr. 18, 1922 |
| 1,822,976 | Maxwell | Sept. 15, 1931 |
| 1,868,748 | Hogan | July 26, 1932 |
| 1,900,688 | Baum | Mar. 7, 1933 |
| 1,982,242 | Bellanca | Nov. 27, 1934 |
| 2,146,014 | Grant | Feb. 7, 1939 |
| 2,262,968 | Schmidt et al. | Nov. 18, 1941 |
| 2,286,150 | Mercier | June 9, 1942 |
| 2,346,464 | Tampier | Apr. 11, 1944 |

FOREIGN PATENTS

| Number | Country | Date |
|---|---|---|
| 474,065 | Great Britain | Jan. 17, 1935 |